March 16, 1971  C. S. GARTRELL  3,570,044
SAUSAGE PEELING MACHINE
Filed Oct. 21, 1968  2 Sheets-Sheet 1
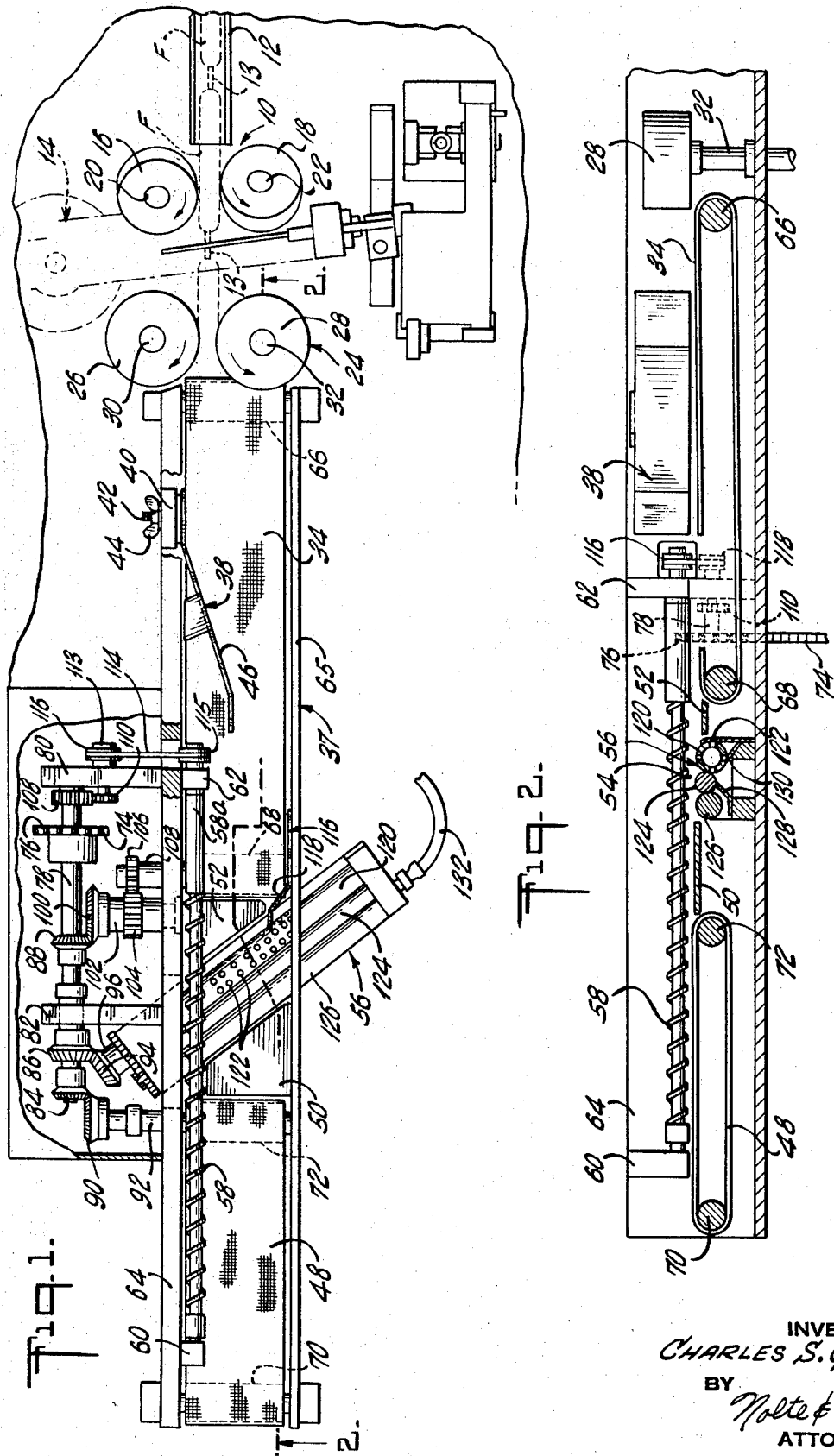
INVENTOR
CHARLES S. GARTRELL
BY
Nolte & Nolte
ATTORNEYS

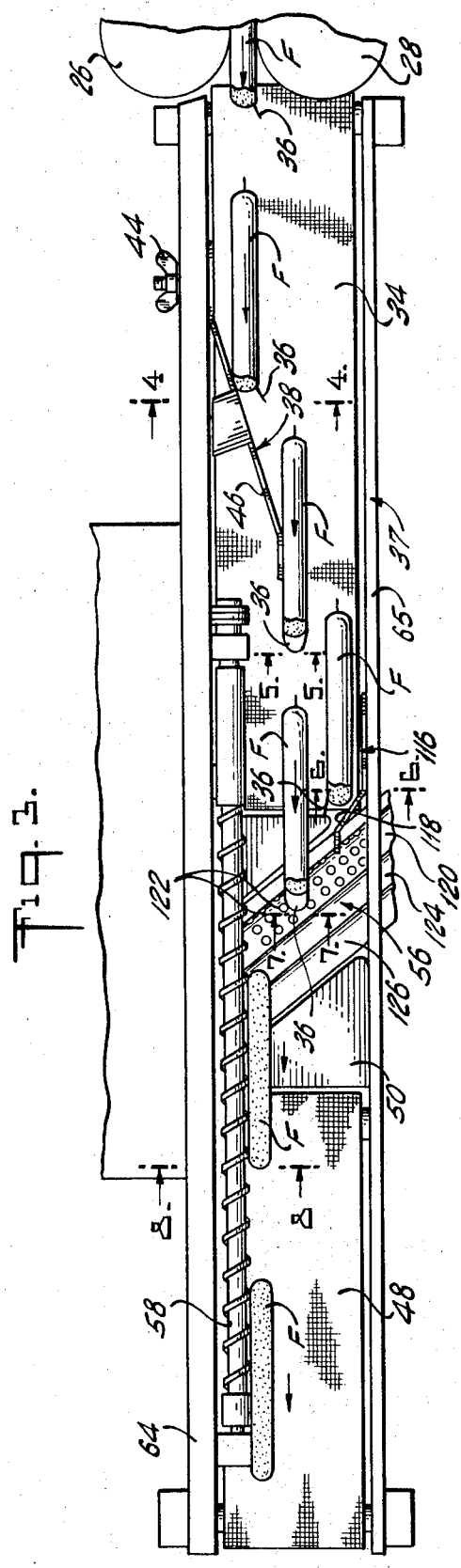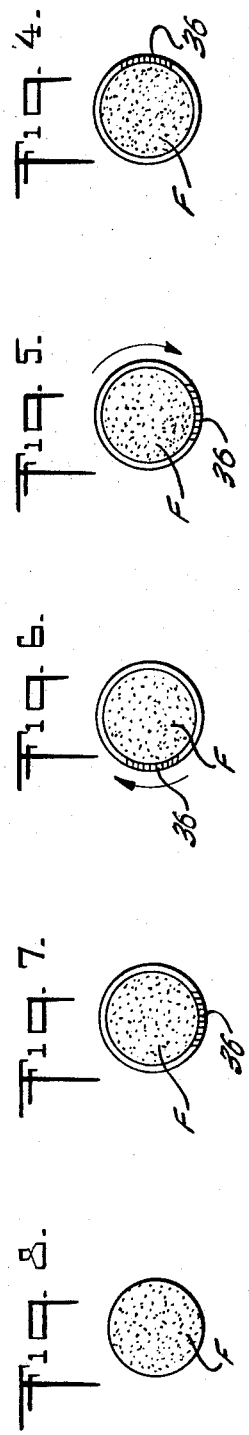

United States Patent Office 3,570,044
Patented Mar. 16, 1971

3,570,044
SAUSAGE PEELING MACHINE
Charles S. Gartrell, Florham Park, N.J., assignor to Linker Machines Inc., Newark, N.J.
Filed Oct. 21, 1968, Ser. No. 769,061
Int. Cl. A22c 13/00
U.S. Cl. 17—1
9 Claims

ABSTRACT OF THE DISCLOSURE

An apparatus for automatically transporting sausages, frankfurters and the like individually to a station whereby the casings thereof are stripped from the sausages by vacuum means. The transport chute is provided with at least one deflector plate which imparts rotational movement to the linear-moving sausages, and an helical feed screw is incorporated to assist in the transport of the sausages along said chute.

BACKGROUND OF THE INVENTION

Apparatus for automatically peeling sausage casings at a high rate of speed are known. For example, U.S. Pat. No. 2,672,646 to Demarest et al. discloses such an apparatus. However, the device shown in the aforesaid patent comprises a plurality of upper and lower feed rollers which are angularly placed relative to the linear travel of the sausages. This particular arrangement, while effective in moving the individual sausages to the suction skin stripping device, is nevertheless cumbersome and costly. In addition, the multitude of parts in the feed of the apparatus result in frequent occurrence of gearing breakdown thereby necessitating a frequent shut-down of the machine for repair purposes. Moreover, the design of previous machines, such as disclosed in said U.S. Pat. No. 2,672,646, did not permit the accommodation of sausage links of a variety of lengths. In addition, the transport speed of known sausage stripping machines was considerably limited by the multiple banks of feed rollers.

SUMMARY OF THE INVENTION

The present apparatus for transporting several links of sausages, frankfurters and the like which have holding tabs utilizes an elongated chute having at least one deflector plate in the path of linear movement of the sausages. The deflector plate is so positioned that the individual sausages or frankfurters striking the same have rotational movement imparted thereto. This rotational movement ensures that the respective tab of each sausage is located in the proper position for the stripping device to helically tear and peel off the casing of each sausage link.

After the aforesaid operation is completed, the individual sausage continues in a linear movement along the chute. An helical screw is employed in order to continue the movement of each of the links.

It is an object of the present invention to provide an apparatus for peeling casings from sausages, frankfurters and the like that is simple in construction, efficient in operation and can be used for a variety of sizes of sausage links.

It is another object of the present invention to provide a structure in which the surface transport speed of the sausage and frankfurter links is considerably increased, thereby permitting the processing of more sausages per hour than in previous machines.

It is still another object of the present invention to simplify the drive mechanism for the apparatus and to further use a sectionalized conveyor belt instead of a multiplicity of feed rollers.

It is an object of the present invention to provide a primary deflector plate and an auxiliary deflector plate spaced from and on the opposite side of the conveyor chute for orienting each of the sausage links to the proper position relative to the sausage casing stripping device.

BRIEF DESCRIPTION OF THE DRAWING

The invention is illustrated by way of example in the accompanying drawings which form part of this application and in which:

FIG. 1 is a top plan view of the sausage peeling apparatus embodying the teachings of the present invention.

FIG. 2 is a sectional view of the apparatus taken along the lines 2—2 of FIG. 1.

FIG. 3 is an enlarged partial top plan view of the sausage peeling apparatus illustrating the mode of transport and skinning of the sausages.

FIG. 4 is an end elevation view of one of the sausages taken along the lines 4—4 of FIG. 3.

FIG. 5 is an end elevation view of one of the sausages taken along the lines 5—5 of FIG. 3.

FIG. 6 is an end elevation view of one of the sausages taken along the lines 6—6 of FIG. 3.

FIG. 7 is an end elevation view of one of the sausages taken along the line 7—7 of FIG. 3, and FIG. 8 is an end elevation view of a skinned sausage taken along the lines 8—8 of FIG. 3.

Referring to the drawings and especially the right-hand side of FIG. 1, there is shown a device for severing the encased links of sausages or frankfurters at the ligatures or ties, a device for clamping these ligatures prior to the severing operation of the links, a device for slitting the casing of each link transversely near the end of the link, and a device for forming the severed ligatures beyond the slit with a holding tab by which the casing may be torn or removed helically from the stuffings. This particular arrangement is set forth in U.S. Pat. No. 2,672,646 to Demarest et al., issued on Mar. 23, 1954 and forms no part of the present invention. However, generally speaking, the feed device 10 functions to move a string of sausages or frankfurters along entry trough 12 toward the field of operation of the feeler device 14 and includes a pair of feed rollers 16 and 18 located on opposite sides of the frankfurter and in feed engagement therewith. These feed rollers 16 and 18 are so constructed and mounted to impart to the frankfurter engaged thereby both an endwise movement toward the feeler device 14 together with a partial rotary movement. It should be noted that feed rollers 16 and 18 are secured to the upper ends of respective shafts 20 and 22 and are inclined in opposite directions with respect to the vertical as well, as being peripherally grooved for feed engagement with the frankfurters. The advancing end of the sausage or frankfurter F is operated upon by the feeler device 14 and the sausage is then picked up by the second feed device 24. This feed device 24 comprises a pair of cylindrical feed rollers 26 and 28 located on opposite sides of the sausage in feed engagement therewith and secured to the upper ends of respective vertical shafts 30 and 32. The feeler device 14 senses the ligature 13 and initiates operation of a ligature severing device (not shown), together with a skin-slitting device and a tab-forming device while the feeler device 14 functions as a ligature clamping device. Thus, when the sausage links F arrive at the beginning of the first conveyor section 34 a tab has been formed therein for initiating the helical stripping of the frankfurter skin which is hereinafter more fully disclosed.

When each of the sausages F is severed from the chain of sausages and is provided with a tab 36 and emerges from the second pair of feed rollers 26 and 28 as shown in FIG. 3, said sausages move linearly on to the first conveyor section 34 of the elongated transport chute 37.

A deflector plate 38 is adjustable along the first conveyor section 34 with respect to the interception of the sausages F moving linearly on the transport chute 37. Accordingly, the deflector plate 38 is provided with a support portion 40 having a threaded stud 42 upon which a wing nut 44 is fastened. An angular portion 46 of the plate 38 projects into the path of travel of the sausages F. Thus, the deflector plate 38 may be adjusted for different lengths of sausages or frankfurters. In fact, frankfurters range in length from small wieners of about 3⅝ inches to large hot dogs of about 14 inches, and an adjustment must be made of the deflector plate 38 to permit the sausages which are moved out of the feed rollers to move linearly on the first conveyor section 34 before the strike the deflector plate.

FIG. 3 discloses a sausage F moving along the first conveyor section 34 and striking the angular portion 46 of the deflector plate 38. When the linearly-moving sausage strikes the angular portion 46 a slight rotational movement is imparted to the sausage F. The rotational movement can be seen by comparing the position of sausage F in FIG. 4 as it strikes the deflector plate 38, and in FIG. 5 where the sausage is rotated clockwise and the tab 36 moves approximately 90 degrees.

The chute 37 is further provided with a second conveyor section 48 together with two triangular-shaped stationary plates 50 and 52. The stationary plates are spaced from each other forming an opening 54 in which the suction skin-stripping device 56 is positioned.

An helical feed screw 58 is shown mounted in bearing blocks 60 and 62 secured to one side wall 64 of the chute 37.

As seen in FIG. 2, the first conveyor section 34 is an endless belt which passes around rollers 66 and 68 respectively while the second conveyor section 48 is also an endless belt which passes around the rollers 70 and 72 respectively. It should also be noted that rollers 68 and 72 are drive rollers for the conveyor sections.

The driving mechanism for the components of the present apparatus is clearly seen in FIG. 1 and constitutes a main chain drive 74 operatively connected to a motor (not shown) and driving a sprocket 76 on main drive shaft 78. The main drive shaft 78 is mounted for rotation in spaced bearing supports 80 and 82 and is provided with bevel gears 84, 86 and 88 secured thereon. Bevel gear 84 meshes with bevel gear 90 on one end of the shaft 92 of the drive roller 72. Thus, the second conveyor section 48 is driven by main drive shaft 78 through bevel gears 84 and 90. Bevel gear 86 meshes with bevel gear 94 on the shaft 96 of the rotatable drum 120 of the suction skin-stripping device 56 and causes the drum to rotate at a selected speed. Bevel gear 88 meshes with gear 100 mounted on the jackshaft 102, while spur gear 104 also on the jackshaft meshes with spur gear 106 secured on the shaft 108 of the drive roller 68. Thus, the first conveyor section 34 is driven by gears 88, 100, 104 and 106 respectively.

The drive for the helical screw 58 also comes off the main drive shaft 78 and constitutes a spur gear 108 engaging and meshing with a spur gear 110 on stub shaft 112. A pulley 114 passes about the sheave 116 on shaft 112 and the sheave 118, the latter being fixed to the end 58a of the helical screw 58.

Although a single deflector plate 38 is generally sufficient to impart the necessary rotatable movement to the individual sausages, an auxiliary deflector plate 116 may be mounted on the opposite wall 65 of the transport chute 37. Thus, as shown in FIG. 3, if a sausage F is deflected laterally too great a distance and thereby rotates more than the required rotation thereof the sausage will strike the angular part 118 of the auxiliary deflector plate 116 and thereby cause the same to rotate in reverse to the required position, with the tab 36 of the sausage F directly engaging the suction skin-stripping device 56. In any event, each of the sausages F must arrive over the device 56 with its tab down and directly engaging the device (FIG. 7), so that vacuum skin-stripping device 56 grasps the tab 36 of the sausage F and neatly tears and peels off the casing in the form of an helical strip.

The skin-stripping device is known from the aforesaid U.S. Pat. No. 2,672,646 and comprises a rotatable drum 120 with openings 122, a feed roller 124 and a pressure roller 126. Also associated with the skin-stripping device are scrapers 128 and 130 which prevent the skin strips emanating from the sausages from being carried too far around the feed roller 124 and the drum 120, respectively. A vacuum line 132 from a vacuum source (not shown) is connected to the drum 120.

It should be noted that after the casings of the sausages F are stripped as shown in FIG. 8 of the drawings, the rotatable screw 58 assists in moving the sausages linearly along the second conveyor section 48. Therefore, the skinless sausages or frankfurters continue along the transport chute 37 for packaging or other required dispensation of the sausages.

It is to be understood that although reference is made herein mainly to sausages, this term is intended to be broad enough to include any food product stuffed in a tubular casing, such as a frankfurter, wiener, sausages and the like.

What is claimed is:

1. A transporting apparatus for moving individual frankfurters or the like from a feeding device to a skin-stripping station comprising a conveyor forming a generally horizontal path of movement for said frankfurters and having a longitudinal axis, said conveyor moving said frankfurters separately and generally endwise in the direction of said skin-stripping station, a deflecting means located adjacent to and extending over said conveyor, means for adjusting said deflecting means along the longitudinal axis of said conveyor relative to said feeding device, said deflecting means being in the path of movement of each of said frankfurters whereby the leading edge of said frankfurter engages said deflecting means and causes said frankfurter to rotate while moving forward endwise, and said frankfurter is directed to an operative position while continuing to rotate for peeling of said frankfurter skin in a helical strip at said skin-stripping station, and a rotatable feed means for assisting in the continued movement of said frankfurter after it leaves said skin-stripping station.

2. A transporting apparatus for moving individual frankfurters to a skin-stripping station as claimed in claim 1 wherein said deflecting means is a plate angularly disposed relative to the longitudinal axis of the conveyor and in the path of movement of said frankfurter.

3. A transporting apparatus for moving individual frankfurters to a skin-stripping station as claimed in claim 2 further comprising a second deflecting means located on the opposite side of said conveyor from said first deflecting means.

4. In a machine of the type set forth in claim 2 wherein said plate on said conveyor is positioned at an obtuse angle with respect to the longitudinal axis of said conveyor.

5. A transporting apparatus for moving individual frankfurters to a skin-stripping station as claimed in claim 2 wherein said plate deflecting means has a major portion thereof that extends angularly rearwardly relative to said axis of said conveyor.

6. A transporting apparatus for moving individual frankfurters to a skin-stripping station as claimed in claim 1 wherein said feed means is an elongated rotatable screw secured at one side of said conveyor and adjacent to said skin-stripping station for moving any frankfurter that engages said screw along said conveyor, and means for rotating said screw.

7. A transporting apparatus as claimed in claim 6 further comprising drive means including a common drive shaft, and means drivingly connecting said common drive shaft to said elongated screw for rotating the same.

8. A transporting apparatus as claimed in claim 1 wherein said conveyor comprises a first conveyor section and a spaced second conveyor section, said skin-stripping station being positioned between said first and second conveyor sections, and a common drive means for driving said conveyor sections.

9. A transporting apparatus as claimed in claim 1 further comprising drive means including a common drive shaft, gear means on said common drive shaft, and gear means on said conveyor and skin-stripping station co-acting with said gear means on said common drive shaft for simultaneously driving said conveyor and the skin-stripping means.

References Cited
UNITED STATES PATENTS

| | | | |
|---|---|---|---|
| 2,463,157 | 3/1949 | Deitrickson | 17—1 |
| 2,672,646 | 3/1954 | Demarest et al. | 17—1 |
| 2,775,784 | 1/1957 | Demarest et al. | 17—1 |
| 2,800,681 | 7/1957 | Demarest | 17—1 |
| 3,019,583 | 2/1962 | Sylvester et al. | 198—29X |
| 3,232,412 | 2/1966 | Bloss | 198—33 |

HUGH R. CHAMBLEE, Primary Examiner